US012106136B2

(12) United States Patent
Soman et al.

(10) Patent No.: US 12,106,136 B2
(45) Date of Patent: Oct. 1, 2024

(54) USER DEVICE COMPLIANCE-PROFILE-BASED ACCESS TO VIRTUAL SESSIONS AND SELECT VIRTUAL SESSION CAPABILITIES

(71) Applicant: VMware, Inc., Palo Alto, CA (US)

(72) Inventors: Sisimon Soman, Sunnyvale, CA (US); Vignesh Raja Jayaraman, Palo Alto, CA (US)

(73) Assignee: Omnissa, LLC, Palo Alto, CA (US)

( * ) Notice: Subject to any disclaimer, the term of this patent is extended or adjusted under 35 U.S.C. 154(b) by 233 days.

(21) Appl. No.: 17/506,069

(22) Filed: Oct. 20, 2021

(65) Prior Publication Data

US 2022/0100533 A1 Mar. 31, 2022

Related U.S. Application Data

(63) Continuation of application No. 16/523,796, filed on Jul. 26, 2019, now Pat. No. 11,163,584.

(51) Int. Cl.
*G06F 9/455* (2018.01)
*G06F 9/445* (2018.01)
*G06F 21/31* (2013.01)

(52) U.S. Cl.
CPC ...... *G06F 9/45558* (2013.01); *G06F 9/44505* (2013.01); *G06F 21/31* (2013.01); *G06F 2009/45587* (2013.01); *G06F 2009/45595* (2013.01)

(58) Field of Classification Search
CPC .. G06F 9/45505; G06F 9/45558; G06F 21/31; G06F 2009/45587; G06F 2009/45595
See application file for complete search history.

(56) References Cited

U.S. PATENT DOCUMENTS

| 7,584,508 | B1 | 9/2009 | Kashchenko | |
|---|---|---|---|---|
| 8,584,247 | B1 * | 11/2013 | Patil | G06Q 10/101 726/4 |
| 9,477,825 | B1 * | 10/2016 | Sinchak | H04L 63/08 |
| 9,609,025 | B1 * | 3/2017 | Betzler | H04L 63/0245 |
| 10,055,231 | B1 * | 8/2018 | Li | G06F 9/5077 |
| 10,182,078 | B2 | 1/2019 | Zhang | |
| 10,511,607 | B2 | 12/2019 | Bansal | |
| 11,595,372 | B1 * | 2/2023 | Sharifi Mehr | H04L 63/20 |
| 2007/0180450 | A1 | 8/2007 | Croft | |

(Continued)

*Primary Examiner* — Jacob D Dascomb

(74) *Attorney, Agent, or Firm* — Kim & Stewart LLP

(57) ABSTRACT

Systems and methods can enable select virtual session capabilities on a user device configured to access a virtual session, which is an instance of a virtual machine. The user device can receive and forward to a gateway sever, a request to launch a virtual session. Based on the virtual session launch request, the gateway server can obtain a compliance profile determined from operational data for the user device and compare it to a minimum access policy ("MAP"). The MAP can include threshold or binary values for states of a group of user device operational aspects. Where the compliance profile satisfies the MAP, the gateway can permit user device access a virtual session hosted on a virtual machine ("VM") server. The virtual session can be configured at the VM server based on the compliance profile so as to allow access to a portion of a full virtual session capability scheme.

20 Claims, 6 Drawing Sheets

(56) References Cited

U.S. PATENT DOCUMENTS

| | | |
|---|---|---|
| 2007/0192329 A1 | 8/2007 | Croft |
| 2014/0007048 A1 | 1/2014 | Qureshi |
| 2014/0007193 A1 | 1/2014 | Qureshi |
| 2019/0004845 A1 | 1/2019 | Ganesan |
| 2019/0188392 A1 | 6/2019 | El-Moussa |
| 2020/0004936 A1 | 1/2020 | Avital |
| 2021/0334091 A1 | 10/2021 | Gujarathi |

* cited by examiner

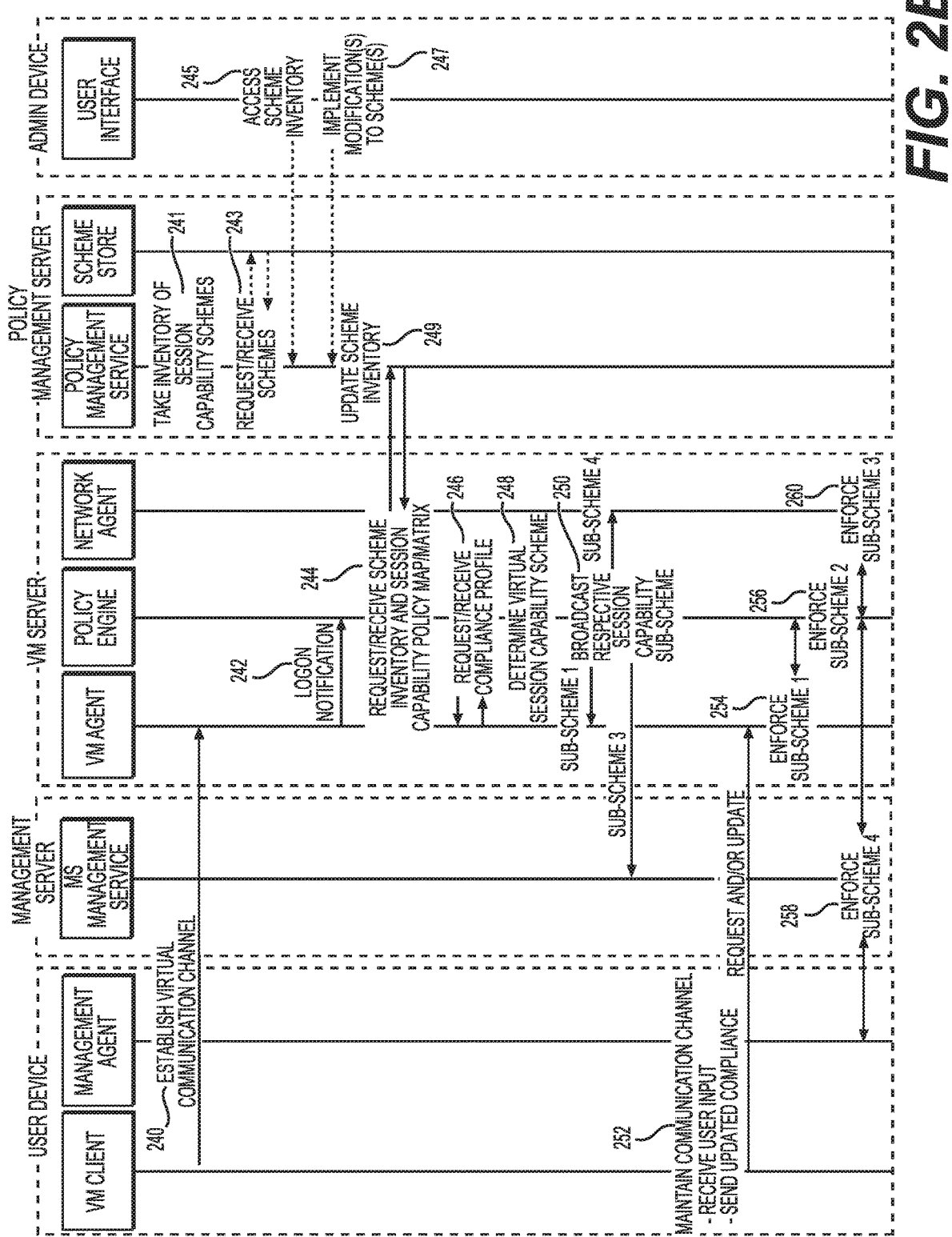

USER DEVICE COMPLIANCE-PROFILE-BASED ACCESS TO VIRTUAL SESSIONS AND SELECT VIRTUAL SESSION CAPABILITIES

This application is a continuation of U.S. patent application Ser. No. 16/523,796, titled "USER DEVICE COMPLIANCE PROFILE-BASED ACCESS TO VIRTUAL SESSIONS AND SELECT VIRTUAL SESSION CAPABILITIES" and filed Jul. 26, 2019, which is incorporated herein in its entirety for all purposes.

BACKGROUND

Enterprises are increasingly utilizing computing infrastructures that implement virtual environments to provide flexible computing solutions that increase work force productivity. With a virtual environment, an employee can use a computing device that may be their own, issued by an enterprise, or publicly available, to access virtual sessions hosted by a server for the enterprise. A virtual session can be an instance of a virtual machine ("VM") that: is instantiated by a server (for an enterprise); constitutes a virtualized computing environment; is accessed over a period of time that can be monitored, managed, or limited for security and other purposes; and allows workers to effectively access a desktop and enterprise applications that run in the respective virtual machine. More succinctly, a virtual session can simulate an operating system that supports multiple applications and provides an enterprise managed computing environment that can be utilized by an employee on different devices and from multiple locations.

A foundational purpose for enterprises to utilize virtual environments is to provide increased opportunities for employees to be productive. Such environments allow an enterprise and its employees to utilize productivity tools and produce work products at any time, and at locations or facilities where the enterprise, aside from the employee, has no presence. Whenever there is a need for work to be done, an employee can, from their home or a public place, like a coffee shop or while on vacation, be able to work within a computing infrastructure of an enterprise, using the same or substantially the same applications and means of time sensitive communication were they "at work."

However, the flexibility and increased productivity mentioned above must be balanced by implementations of secure systems that prevent sensitive or propriety information from being made available or stolen. Substantial time and resources must be dedicated to ensuring that virtual environments do not provide open doorways that allow viruses, malware, and other elements designed to cripple an enterprise, to be introduced to the enterprise's computing infrastructure. As a result, computing devices used by employees, such as tablets, laptops, mobile phones, and other mobile devices, are managed, updated, or otherwise maintained by enterprises to: incorporate encrypted drives; be constantly updated with security patches and enterprise-specific anti-virus programs; be configured to run, or constantly updated to run, approved versions of operating systems; have specific firewall configurations; have specific rooting and jail-break detection protocols; utilize authentication methods that change; have certain and up-to-date certificates, key-pairs, and the like.

Many enterprises employ procedures and systems to carry out the above methods and provide secure computing infrastructures. However, many of the methods incorporate zero-trust, conditional-access policies and rules that can conflict with the productivity enhancing purpose of a virtual environment. Zero-trust architectures follow a security concept centered on not automatically trusting anything inside or outside of an architecture's perimeters, and verifying anything and everything trying to connect to systems supported by the architecture before granting access. Applying the zero-trust security concept to virtual environments leads to denying access to a virtual session for a device that is not in compliance with an enterprise-specified state for any of a number of components, programs, or network connections. For example, because a mobile device is not compliant with 1 out of a 100 compliance rules, access to a virtual session is denied in total under a conventional implementation of a zero-trust security policy. Although security may be preserved, there is a cost in productivity due to employee downtime—even where no aspect of the non-compliance impacts a productivity-related activity for which the virtual session is being accessed.

As a result, a need exists for a system and method for enabling secure access to virtual sessions and selective virtual session capabilities based on a compliance profile that would be unsatisfactory for granting access to a virtual session configured to implement a full capability scheme, particularly when a zero-trust protocol is being concurrently implemented.

SUMMARY

Examples described herein include systems and methods for enabling select virtual session capabilities on a user device that is configured to access virtual sessions from a VM server. A system can include the user device, or at least one or more managed agents on the user device, a gateway server, and the VM server, that can communicate with one another. In one example, a user may attempt to launch a virtual session on the user device, which causes a VM client on the user device to send a virtual session launch request to the gateway server. The gateway server can obtain a compliance profile for the user device based on receiving the virtual session launch request. The compliance profile can be based on operational data for the user device. As a result, by processing the compliance profile, the gateway server becomes informed of the state of certain components, applications, connections, peripheral device connections, and various operations (together referred to as "operational aspects") for the user device. Thus, rather than include a plurality of rules for a user device to follow to maintain compliance, the compliance profile includes state information for a group of operational aspects that can be monitored on a user device. An enterprise can monitor the device through the compliance profile to keep the device up to date and minimize system security threats and vulnerabilities.

Upon the gateway server determining that the compliance profile satisfies a minimum access policy ("MAP"), the user device may be permitted to access a virtual session hosted on the VM server. The MAP may include threshold, binary, or non-binary values for the states of a core group of operational aspects for the user device. Together, this group of state values can define a minimum level of compliance determined to be sufficient to safeguard a VM server and its hosted virtual sessions, and grant access to a virtual session with a minimum set of capabilities. A profile of the minimum capabilities, in turn, may define a maximum level of non-compliance that a system can tolerate and still allow virtual session access to a user device.

In one example, the compliance profile can include a sub-profile including the state information for the various monitored operational aspects ("compliance sub-profile"), and a sub-profile that encapsulates an assessment of the overall security of the user device. The security sub-profile can be derived from the compliance sub-profile through a comparison with the MAP. More specifically, by looking at a total number and a particular combination of MAP requirements that a compliance profile matches up with, a determination on how secure a user device is can be made.

The grant of access to the user device can trigger the VM server to obtain the compliance profile in order to configure the virtual session being accessed. In one example, configuring the virtual session includes establishing a specified group of virtual session capabilities that will be able to be accessed or implemented while the user device accesses the virtual session. Virtual session capabilities can include, but are not limited to: a capability to perform user device drive mapping; a capability to perform, allow, or limit clipboard operations; a capability to cause or manage printer redirection; a capability of the user device to copy data from the virtual session (data egress); a capability to copy data from the user device to the virtual session (data ingress); a capability to allow or restrict display of classified documents while particular applications-screen capture or web-conferencing software, for example—are running; a capability to be connected to a segment of a network that connects servers or databases that store sensitive data; a capability to serve devices with access to backend network resources; a capability to enable/disable BLUETOOTH and/or USB device redirection and/or to configure the settings for enabled redirection; a capability to enable/disable direction-sensitive file transfer and/or to configure settings for enabled file transfer; a capability to run certain applications on the user device while the virtual session is being accessed; and the like.

Access to a virtual session can include the selected capability scheme being implemented through the VM server. In one example, the selected capability scheme may be selected from a plurality of session capability schemes, each of the plurality of schemes incorporating a respective combination of less than all of capabilities from a full capability scheme. The full capability scheme may be configured to have access to all virtual session capabilities available through the VM server to a standard virtual session configured for the user device. Thus, through the implementation of the selected capability scheme, a user device can be allowed access to a portion of capabilities for the full capability scheme.

The user device can access the virtual session through a virtual channel between the user device and the VM server. In one example, for the virtual channel to be established and maintained, a VM client on the user device can communicate with a VM agent maintained by the VM server through a virtual machine. After access is permitted and the virtual channel is established, the VM server can continuously receive additional compliance profile information. In turn, the VM server can cause a capability scheme being implemented to be changed, or certain session capabilities for the scheme to be made available or discontinued based on the updated compliance profile.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 2B is a sequence diagram of an example method for configuring virtual session capabilities.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods can enable select virtual session capabilities on a user device configured to access a virtual session, which is an instance of a virtual machine. The user device can receive and forward to a gateway sever, a request to launch a virtual session. Based on the virtual session launch request, the gateway server can obtain a compliance profile determined from operational data for the user device and compare it to a minimum access policy ("MAP"). The MAP can include threshold or binary values for states of a group of user device operational aspects. Where the compliance profile satisfies the MAP, the gateway can permit user device access to a virtual session hosted on a virtual machine ("VM") server. The virtual session can be configured at the VM server based on the compliance profile so as to allow access to a portion of a full virtual session capability scheme.

Figure 1:
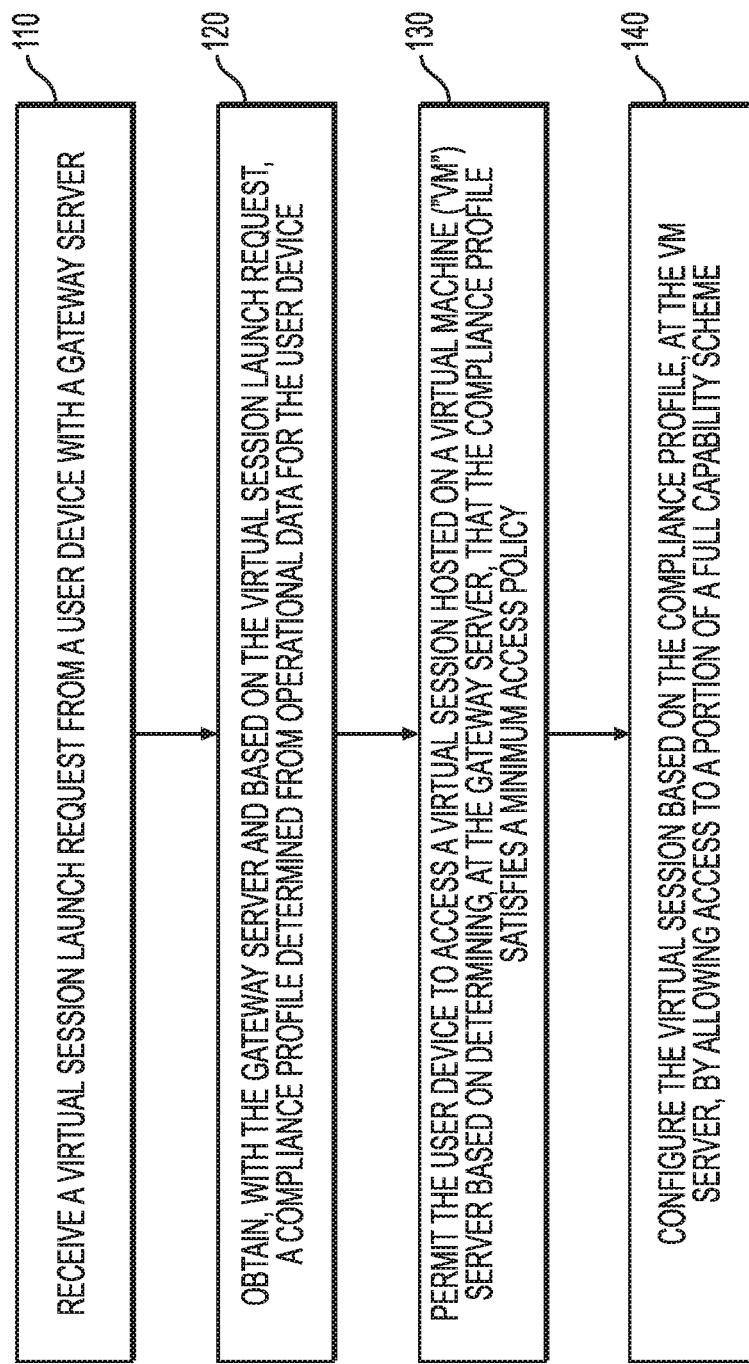
FIG. 1 is a flowchart of an example method for permitting access to a virtual session and enabling select virtual session capabilities on a user device.
Figure 2A:
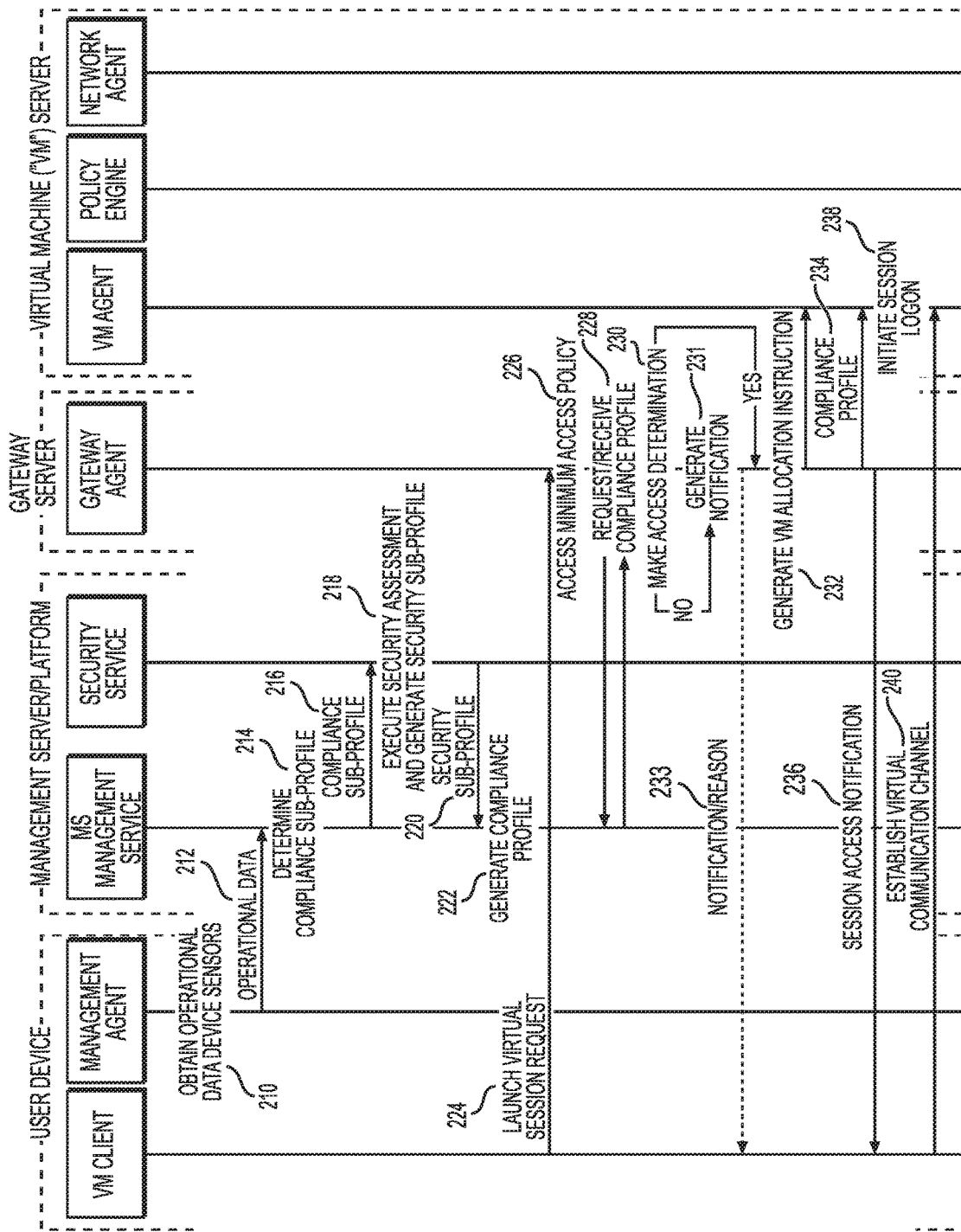
FIG. 2A is a sequence diagram of an example method for permitting access to a virtual session based on a compliance profile for a user device.
Figure 3:
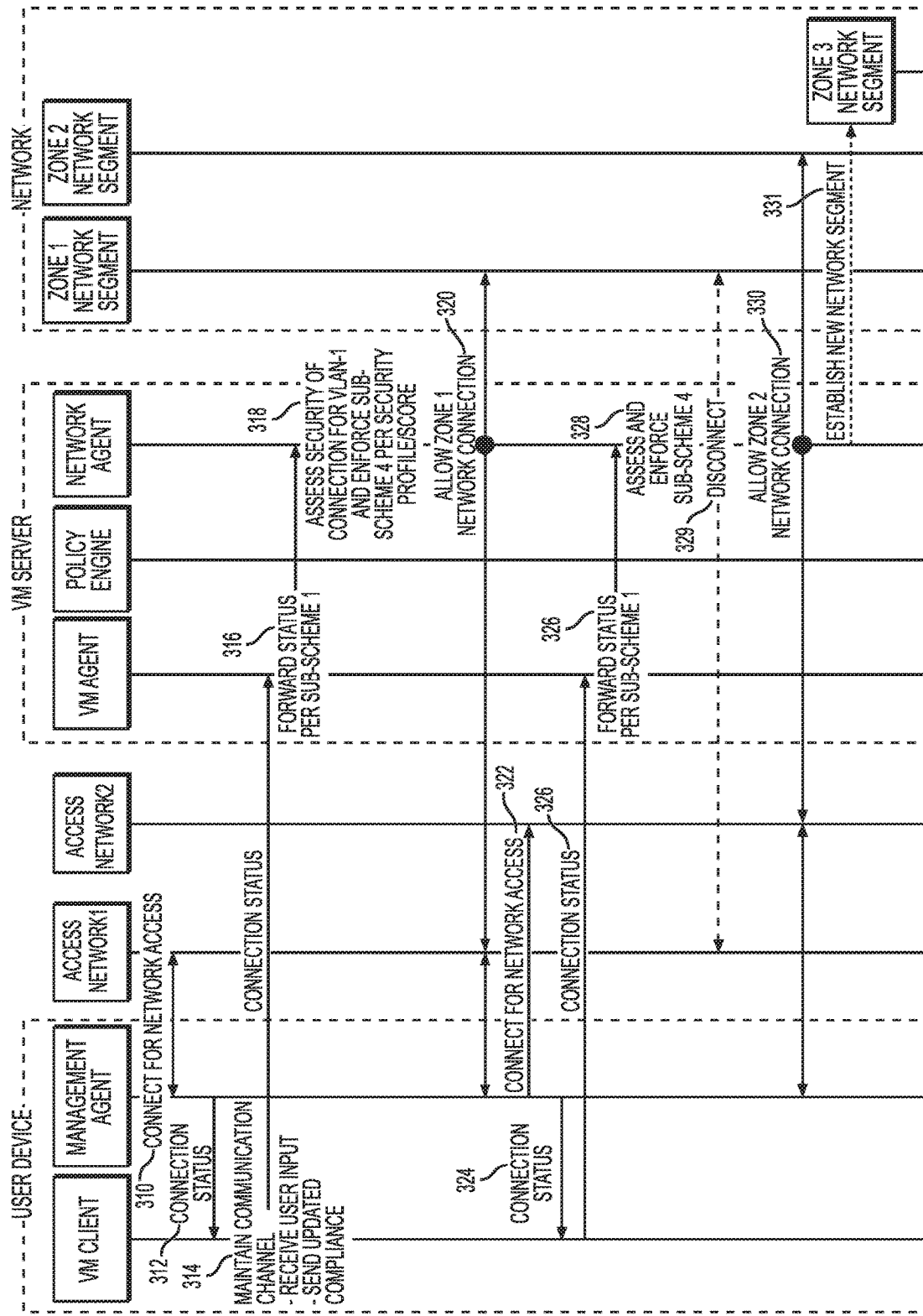
FIG. 3 is a sequence diagram of an example method for enforcing a virtual session capability scheme based on a change to a configuration of a network connection.

FIG. 1 is a flowchart of an example method for permitting access to a virtual session and enabling select virtual session capabilities on a user device. FIG. 2A provides a detailed sequence diagram for an aspect of the method of FIG. 1 directed toward permitting access to a virtual session based on a compliance profile for a user device. FIG. 2B provides a detailed sequence diagram for an aspect of the method of FIG. 1 directed toward configuring virtual session capabilities and updating a capability configuration based on changes to a compliance profile for a user device. Changes to the virtual session capabilities can be enforced by one or more agents being implemented on a VM server which hosts the virtual session being accessed by the user device. FIG. 3 provides a detailed sequence diagram for an aspect of the method of FIG. 2B directed toward enforcing a sub-scheme of a virtual session capability scheme. In particular, FIG. 3 illustrates an exemplary method of enforcing a sub-scheme based on a change to an aspect of a compliance profile of a user involving a nature of a connection between the user device and a network. The sub-scheme can be a part of an overall virtual session capability scheme, involving virtual session capabilities that are normally implemented, permitted, or otherwise managed by the network agent, and can be enforced by an actor that normally manages the session capabilities involved (i.e., the network agent).

Figure 4:
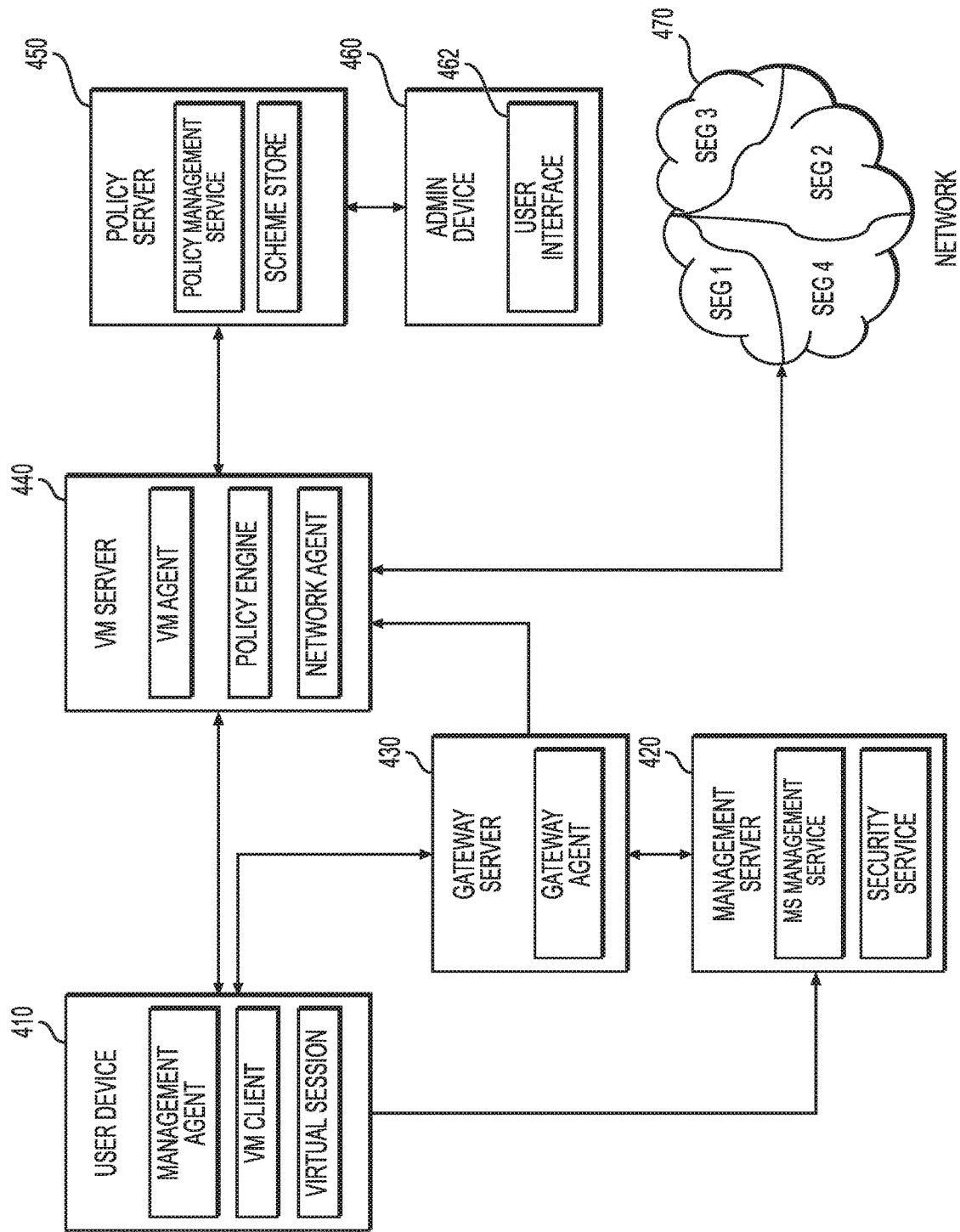
FIG. 4 illustrates a schematic representing exemplary system components for permitting access to a virtual session and enabling select virtual session capabilities on a user device.
Figure 5:
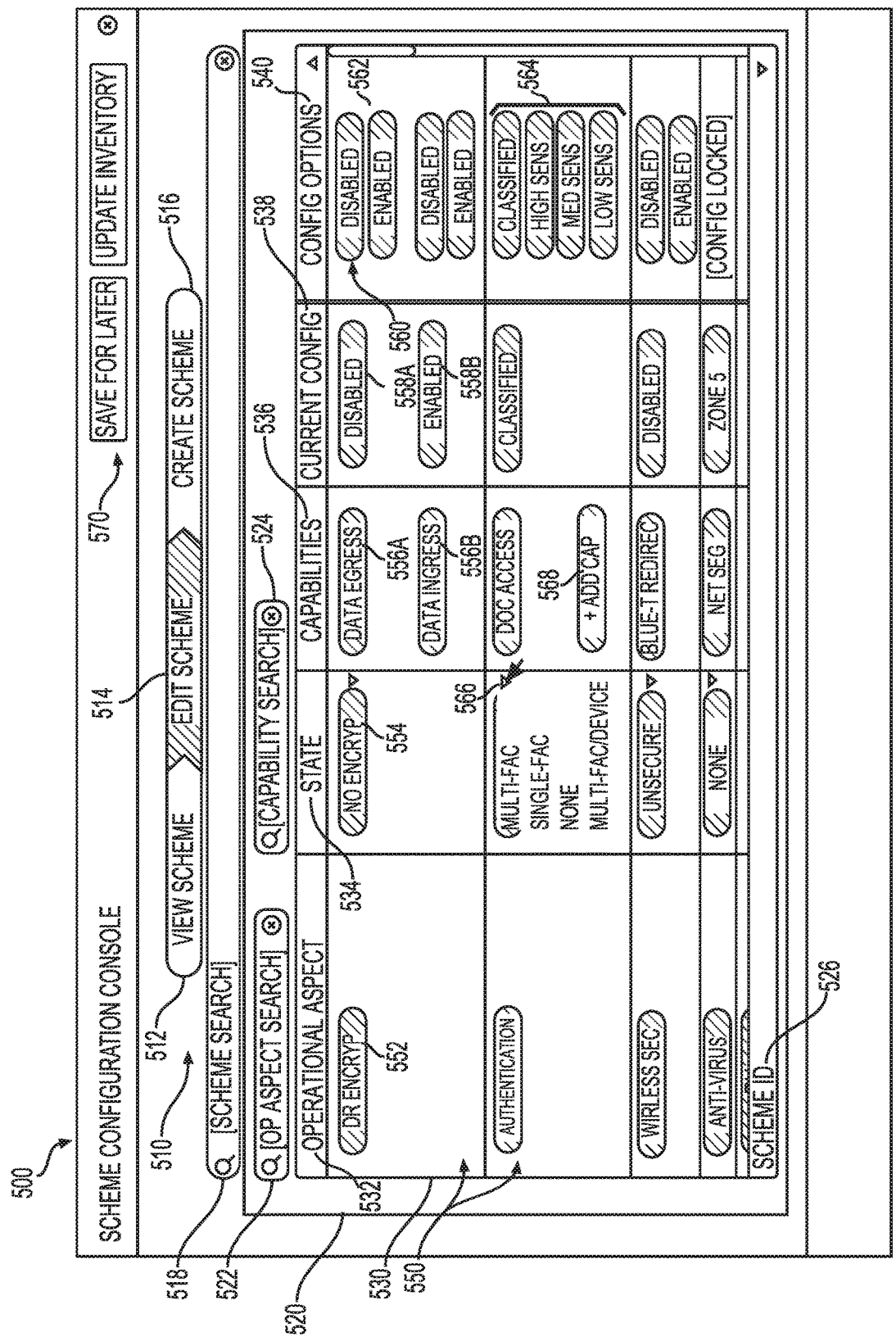
FIG. 5 is an illustration of an example graphical user interface ("GUI") of a console used to customize virtual session capability schemes to be implemented by various methods described herein.

FIG. 4 illustrates a schematic representing exemplary system components and communications between system components for implementing the methods described herein. In particular, FIG. 4 can represent system components that respectively communicate as components of an enterprise computing infrastructure that generates and continuously monitors implementations of virtual session capability schemes on user devices that are: enterprise-owned; enrolled with mobile device management ("MDM") or enterprise mobility management ("EMM") systems; or constitute bring your own device ("BYOD") to work devices. FIG. 5 is an illustration of an example GUI of a console used to view, customize, or create virtual session capability schemes that can be implemented on a user device through a virtual server that communicates with a policy server that is accessible through the GUI. In particular, the GUI of FIG. 5 provides a console that can be used to specify capabilities for a scheme that correspond to operational aspects of a compliance profile.

FIG. 1 is an example method with stages performed by a computing system architecture that may include one or more servers that may be connected through a network and implement or maintain: a backend; one or more user interfaces; one or more databases; and a plurality of computing services.

At stage 110, a gateway server can receive a virtual session launch request from a VM client operating on a user device. The request can be generated based on a user input to an interface for the user device, or a specific interface for the VM client provided on the user device. In another example, the input causing the request can be generated by an operating system ("OS") on the user device or the VM client itself performing a programmed routine that requires access to a virtual session.

In one example, the VM client can be a managed application that is installed on the user device as part of enrolment in an EMM or MDM system. The VM client can provide access to VMs managed by the enterprise on a VM server. In one example, a management interface for a VM server can open a socket for sending graphics information from a virtual session to the VM client. The socket can be used for sending user interface events from the user device to a virtual session. In one example, the gateway server can include one or more servers, and be a reverse proxy server. As such, the gateway server can be maintained behind a firewall in a private network and can direct requests from clients to an appropriate backend server, such as a VM server.

At stage 120, the gateway server can obtain a compliance profile for the user device in response to receiving the virtual session launch request. The compliance profile can be determined from operational data acquired from a plurality of sensors monitoring various aspects of the operations of the user device. In one example, the sensors can monitor and obtain current values for one parameter or a group of operational aspects that respectively define operational states of different components, services, and agents for the user device. The various sensors and the operational aspects being monitored are described in more detail with respect to FIG. 2B.

The compliance profile includes state information for a group of operational aspects that can be monitored on a user device. On the other hand, the MAP and capability schemes described in more detail herein, can embody a plurality of compliance rules or policies. As described in more detail at least with reference to stage 130, state values in a compliance profile can be compared to corresponding operational aspect entries for both the MAP and each of a plurality of virtual session capability schemes. By these comparisons, it can ultimately be determined: (A) whether the user device complies with a minimum scheme of states or policies required to grant access to a virtual session; and (B) what capabilities will be enabled through an accessed virtual session. In addition, an enterprise can continuously monitor a user device accessing a virtual session through the compliance profile, to ensure the device is up to date and to minimize system security threats and vulnerabilities to the user device and enterprise computing infrastructure.

At stage 130, the user device can be permitted to access a virtual session that is hosted by a VM server. The access can be granted by the gateway server based on an evaluation of the compliance profile. In particular, the gateway server can compare the compliance profile to a minimum access policy ("MAP"). In one example, the MAP can stipulate a set of states for a core set of components, services, and agents on the user device that the compliance profile must match. In another example, the MAP can specify several sets of operational states for different combinations of components, services, and agents, that if the compliance profile matches to one of, the gateway server will grant access to a virtual session.

In one example, the compliance profile can be divided into sub-profiles that are determined or populated through separate processes and are based on different inputs. In particular, the compliance profile can include a compliance sub-profile and a security sub-profile described in more detail with respect to FIG. 2A. In one example, a determination by the gateway server to grant virtual session access can be based on a comparison of the compliance sub-profile to the MAP.

A VM server can be one or more servers configured to establish, or allow to be established, a two-way communication channel between it and the user device. In addition, the VM server can be configured to generate, maintain, and support virtual machines, which can be accessed as the virtual sessions. A virtual session, as an instance of a VM, can be a virtualization of a physical computing device and configured to simulate an operating system that supports multiple applications. A virtual session can include an OS service and a system driver that implements a file system and a registry filtering mechanism. An OS service can include device-level and application-level management sub-agents and manage operations of a virtual session. A system driver can process requests from an OS service for I/O operations such as program calls for routines and sub-routines, and command various programs, devices, or an operating system to perform the necessary functions to satisfy requests.

In stage 140, the virtual session can be configured at the VM server, based on the compliance profile. In one example, the virtual session can be configured by the VM server to permit the virtual session to access a portion of a full capability scheme. The full capability scheme being configured to have access to all virtual session capabilities available through the VM server to a standard virtual session configured for the user device. With respect to the portion of the full capability scheme, the accessed virtual session can implement a capability scheme selected, based on the compliance profile, from a plurality of session capability schemes. Each of the plurality of schemes incorporates a respective combination of less than all of capabilities incorporated in the full capability scheme. Thus, through the implementation of the selected capability scheme, a user device can be allowed access to a portion of capabilities for the full capability scheme.

Table 1 below provides some exemplary implementations of the method of FIG. 1 according to some exemplary scenarios. For each implementation, a capability scheme of an accessed virtual session includes a portion, but not an entirety, of a full capability scheme.

fests itself through the virtual session only when a user performs an explicit data copy action from the user device into the virtual session. Under the unaltered zero-trust application, because the mobile device is not compliant with this 1 rule out of 100 compliance rules, access to a virtual session is denied in total. This will be the case even though the threat will never materialize if the employee does not copy while exercising a task, and therefore can be safely mitigated by disallowing the employee from being able to copy into the virtual session. However, if a system for a computing infrastructure serving the employee was capable of implementing Scenario 4, the employee could successfully engage in a productivity generating activity in the coffee shop.

Staying with this example, when the employee returns to work, because the mobile device has not been used or

TABLE 1

| Scenario | User Device Operational Aspect(s) | State of Op. Aspect | Capability Impacted | Capability Configuration (Policy Enforcement per Scheme) |
|---|---|---|---|---|
| 1 | Drive encryption | Not encrypted | Data egress (data copied from session to user device) | Disabled - No data egress (enforce a data loss prevention policy) |
| 2 | Firewall/Antivirus software configuration | Unsecure configuration | i) Data egress ii) Data ingress (data copied from user device to virtual session) | i) Disabled ii) Disabled |
| 3 | Authentication mode | Single factor (not multi-factor) | i) Bluetooth device redirection ii) Direction sensitive file transfer iii) Document access | i) Disabled ii) Enabled iii) Non-confidential/Low-sensitivity document opens only |
| 4 | Wireless connection security | Unsecure - connected via open/public connection | i) Bluetooth device redirection ii) Direction sensitive file transfer iii) Data egress | i) Disabled ii) Enabled iii) Disabled |
| 5 | Screen Capture Software | Active - Running | Document display within virtual session | Restricted to non-classified documents |
| 6 | Antivirus Software | Running prior version | Connection to network (Criticality rating of network segment user device will connect to) | Zone 3 network segment - (e.g., virtual session quarantined to low criticality network segment to prevent access to backend network resources) |

It will be noted that data egress and ingress control, as referred to in Table 1, can be implemented through multiple underlying virtual session capabilities, such as device drive mapping, clipboard copy/paste control and USB device redirection.

The example of an employee on vacation is illustrative of the applicability, and some of the advantages over an unaltered application of a zero-trust concept to a virtual environment, of several scenarios provided in Table 1. The employee may be sitting in a coffee shop, attempting to access a virtual session by connecting to an enterprise network through the coffee shop's unsecure internet connection, for example. The mobile device may be in compliance with 99 out of 100 compliance rules. In one example, non-compliance with the remaining rule may potentially expose the enterprise computing infrastructure to threat of malicious data and/or code moving through a covert channel, from the mobile device into the enterprise computing infrastructure. In one example, the potential exposure manifests otherwise allowed to access computing resources for the enterprise, security patches for the mobile device may not be up to date. The missing security patches may have no relation to what the employee would use the mobile device for with respect to a virtual session, but since it is out of compliance, the employee may have to wait minutes or hours for the enterprise to update the patches on the mobile device before a virtual session can be accessed. With an unaltered application of a zero-trust policy, the downtime of an ability to access a virtual session results in a loss of productivity for the enterprise. According to the present disclosure, a capability scheme could be generated and implemented to provide access to a virtual session while patches are being updated, instead of locking the employee out completely. More specifically, depending on the nature of the missing patch, for example an anti-virus patch, the scheme can limit some functionality, for example making the entire virtual session read only, until update is complete.

As a result, the employee can work without interruption while security threats to a computing infrastructure are mitigated.

Turning to the sequence diagram of FIG. 2A, at stage 210, a management agent being implemented on a user device can obtain operational data from a plurality of device sensors.

At stage 212, the management agent can transmit the operational data to a management server management service ("MS management service"). The user device can be managed, in part, by the management server. In one example, the management server may manage device enrollment within an enterprise EMM or MDM system. As a result of enrollment, control of certain functionality for the user device can be turned over to the management server. The management server can implement that control over the user device in a variety of ways, including by communicating instructions to the management agent and receiving responses from the management agent. These communications can flow through the MS management service, for example.

At stage 214, the MS management service can process the operational data in order to determine state values for various operational aspects of the user device. Operational aspects and respective state values are discussed in more detail with reference to stage 230 discussed below. The management server or platform is charged with computing or otherwise determining a compliance profile for the user device based on the operational data.

In one example, the compliance profile includes state values for a group of operational aspects. Together, the operational aspects can represent an overall level of compliance of the user device relative to a baseline standard of operating requirements that is enforced within a computing infrastructure. In another example, the compliance profile may include two parts: a compliance sub-profile, and a security sub-profile. The compliance sub-profile includes the state values that represent an overall level of compliance as discussed above. On the other hand, the security sub-profile is derived from the compliance sub-profile by a security service upon being transmitted by the MS management service to the security service in stage 216. As described in more detail with reference to stage 218, the security service can consult databases, external or natively housed analytics, or intelligence platforms or services to generate the security sub-profile. These resources can define both internal or external threats and vulnerabilities, or otherwise assist the security service in deriving a profile of security, threats, and vulnerabilities for the user device, from a compliance sub-profile.

In one example, the management server may be an internal component of the computing infrastructure, and the MS management service can be an internal software-based tool implemented on the management server. Thus, the management server and its associated tools may be directly managed and controlled by administrative entities for the infrastructure. In another example, the management server can be provided and maintained by a third-party service provider. For example, the third-party service may be provided as a product, such as OPSWAT or AIRWATCH BY VMWARE, that secures and manages endpoints (e.g., user devices), by monitoring, classifying, assessing, and managing applications. In one example, such third-party service may be a cloud-based service that connects to an enterprise network to service various components of a computing infrastructure.

Upon receiving the compliance sub-profile in stage 216, the security service can execute a security assessment at stage 218. The security service can access internal and external resources, such as those mentioned above, and process the security-related information stored or obtained in light of the state values in the compliance sub-profile. Through comparison or other means of processing (e.g., estimating, extrapolating, implementing machine learning processes) that implements one or more algorithms, the security service can assess how secure or unsecure the user device is in stage 218. In another example, the security assessment can be based on a total number of compliant states reflected in the compliance sub-profile. For example, the management server can process and interpret the states that are non-compliant, as corresponding to system vulnerabilities or an overall degree of system vulnerability to various issues.

The security assessment can be output in the form of, or used to output, a security sub-profile. In one example, the security sub-profile may comprise a group of risk or security factors that (A) the security service determines values for, (B) are based on certain state values from the compliance sub-profile, and (C) are according to one or more algorithms. In another example, the security sub-profile may include one or more scores that the management server or gateway server can compare to a scale or other standard to determine how secure the user device is. At stage 220, the security service can transmit the security sub-profile to the MS management service.

In another example, stage 218 can be performed primarily by the MS management service, and stages 216 and 220 can be avoided. More specifically, the MS management service can communicate with the security service to obtain security information, execute the security assessment using the compliance sub-profile, and generate the security sub-profile. In this example, the security service can constitute, house, or provide access to the databases, analytics, or intelligence platforms or services, to act as a provider to or portal for the MS management service to obtain the required security information.

At stage 222, the MS management service processes the compliance and security sub-profiles to generate the compliance profile. In one example, the compliance profile is a combination of the two sub-profiles. In another example, the MS management service combines the compliance and security sub-profiles, derives state values or computes additional security scores from the combined information, and adds the additional information to the combined profiles to produce the compliance profile.

At stage 224, a VM client implemented on the user device can transmit a virtual session launch request ("launch request") to a gateway agent for a gateway server. Transmission of the request can result from the VM client receiving input on the user device from a user through a user interface that is maintained by the user device as part of the VM client. The gateway server can be a reverse proxy server that is maintained behind a firewall in a private network. The gateway server can direct requests from clients to an appropriate backend server, such as the VM server. In another example, the gateway server can provide an added level of abstraction and control to ensure a smooth flow of network traffic between, for example, the VM client and the VM server, in accordance with various security protocols it implements.

At stage 226, the gateway agent accesses a minimum access policy ("MAP") in response to the launch request. The MAP can include threshold or binary values for states of a core group of operational aspects for user devices. Together, this group of state values can define a minimum level of compliance determined to be sufficient to safeguard a VM server and grant access to a virtual session with a minimum of session capabilities. A profile of the minimum capabilities, in turn, may define a maximum level of non-compliance and risk that a system can tolerate while still safely allowing virtual session access to a user device. In one example, the gateway agent can communicate with a policy server, such as the policy server discussed for FIG. 2B, to obtain the MAP. In this example, the policy server may periodically update the MAP housed on the gateway server. In another example, the MAP is configured on the gateway server by an administrator using a user interface associated with the gateway agent.

At stage 228, the gateway agent communicates with the MS management service, to request and receive the compliance profile. In one example, execution of stage 228 can depend from the completion of stage 226. In another example, stages 226 and 228 can be executed simultaneously, at least with the respect to the call by the gateway server to the management server. In yet another example, the gateway agent may only access the MAP after the gateway agent has received the compliance profile from the management server.

At stage 230, the gateway agent can compare the compliance profile to the MAP to determine if the user device is operating at minimally compliant level required to access a virtual session. In one example where the compliance profile includes a compliance sub-profile and a security sub-profile, the gateway agent may only be concerned with comparing the compliance sub-profile to the MAP. In other examples, the gateway agent can compare the security sub-profile to the MAP, instead of or in addition to comparing the compliance sub-profile.

Stages 231 and 233 provide an optional set of stages that may be performed where the gateway agent determines the compliance profile does not satisfy the minimum requirements for virtual session access. In stage 231, the gateway agent can generate a notification that informs that the launch request has been denied. The notification can also provide a reason why access was not granted. At optional stage 233, the VM client can receive the notification and display it in a user interface for the user device. In another example, a registry key can be generated for each operational aspect that is non-compliant with a MAP requirement.

At stage 232, in contrast to the optional stages performed for a denial, the gateway agent generates a VM allocation instruction when it determines that that the compliance profile meets the requirement established by the MAP. The VM allocation instruction can be received by a VM agent of the VM server, causing the VM agent to allocate, or otherwise generate, a virtual machine accessible by a VM client on a user device. A virtual session, as used herein, is an instance of access to a virtual machine by a VM client. A virtual session may extend over a period of time that is monitored, managed, and limited by a VM agent being implemented on the VM server. Stage 232 further includes the gateway agent transmitting the VM allocation instruction to the VM agent.

At stage 234, the gateway agent transmits the compliance profile to the VM agent. In one example, stages 232 and 234 can be combined and the compliance profile can be transmitted along with the VM allocation instruction. At the same time or subsequent to the gateway agent performing stages 232 and 234, the gateway agent transmits a notification to the VM client in stage 236 that virtual session access has been granted. In response to receiving at least the VM allocation instruction, the VM agent initiates a session logon in stage 238.

At stage 240, an action taken by the VM client as a result of receiving the session access notification includes establishing a virtual communication channel with the VM agent. The virtual channel can be characterized as a communication pipe from the VM client to the virtual session. With the virtual channel established, the VM client can send input and requests received on the user device to the virtual session, and the virtual session can carry out operations based on the input and requests according to a capability scheme being implemented.

FIGS. 2A and 2B depict, in one example, a single sequence that includes a first sub-sequence directed to obtaining access to a virtual session (FIG. 2A), and subsequent second sub-sequence directed toward determining and enforcing a session capability scheme once access has been granted (FIG. 2B). Whereas stage 240 described above defines the end of the first sub-sequence, it simultaneously defines the beginning of the second sub-sequence, as illustrated in FIG. 2B. At stage 242, the VM agent can pass on a logon notification to a policy engine for the VM server.

At stage 244, the policy engine can request and receive a scheme inventory and a session capability policy matrix or map ("policy matrix") from a policy management server ("policy server"). The policy matrix can encapsulate a guide or key for the inventory of capability schemes that a policy engine can refer to in order to determine which capability scheme is appropriate for the user device given a specific compliance profile.

The policy server can be a component of a backend for an enterprise that is continuously updated with different policy schemes. Each policy scheme may include or define one or more capability schemes. In one example, the updates can result at a macro level from new security directives, the discovery of new threats and vulnerabilities, or work force restrictions that dictate new data access permissions and application availabilities to different or new groups within the enterprise. In another example, updates may arise on a micro level, wherein policy server management service ("policy management service") receives capability scheme changes from a user interface on an administrative device (a user device operated by an administrator for an enterprise's computing infrastructure).

In one example, the policy engine can read one or more policy schemes hosted as Active Directory Group Policies. In this example, the policy server can connect to and receive a policy scheme through a channel, such as an Active Directory Group Policy channel. In another example, a policy scheme can come from a custom scheme store server.

In one example, the policy management service can periodically update the inventory of capability schemes. It can also be updated through a user interface for an admin device. These processes may optionally be implemented through stages 241, 243, 245, 247, and 249 depicted in FIG. 2B.

As part of the autonomous inventory updating procedure, the management server can take an inventory of capability schemes which it houses at stage 241. In one example, this can include the management server accessing each capability scheme to determine when a most recent update or use occurred. In another example, the policy management service can obtain a most recently issued MAP for comparison to each inventory scheme. The policy management service can then identify each inventory scheme that does not include at least the same requirements as the MAP.

At stage 243, the policy management service can request and receive new or updated capability schemes from a scheme store for the policy server. The scheme store may house a library of every capability scheme in use, or previously used by an enterprise. In one example, the scheme store may communicate with internal or external resources to obtain new schemes and check for new versions of existing schemes.

The other optional procedure in which the inventory of capability schemes may updated is through the user interface for the admin device. More specifically, at optional stage 245, the user interface can access the inventory of capability schemes. In one example, the user interface can be used to view individual capability schemes or groups of schemes. In another example, the user interface may provide an option for an administrator to search for capability schemes. For example, the search can be performed according to individual capabilities or operating requirements that must met by a compliance profile for a particular capability scheme to be implemented.

At stage 247, the user interface can receive and implement modifications to one or more capability schemes. These edited capability schemes are then transmitted to the policy management service as part of stage 247. In another example, new capability schemes can be created through a user interface and transmitted to the policy management service in stage 247.

In stage 249, the management server for the policy server updates the scheme inventory with the edited capability schemes received in stage 247. In addition, the policy management service will update the policy matrix with any requirements that have changed and impact whether a compliance profile would match up with the edited or new capability scheme.

Stages 241, 243, 245, 247, and 249 may occur at any time or on a scheduled basis, as well as during any of the other stages described herein. However, in one example, where the policy server is undergoing an update and receives the request for the scheme inventory and policy matrix from the policy engine, the policy management service will send the policy engine a message in stage 244 that an update is in progress and the requested data will be provided upon update completion.

At stage 246, the policy engine can request and obtain the compliance profile from the VM agent as a result of receiving the logon notification in stage 242. Regardless of whether or not the policy engine is waiting for the inventory scheme or policy matrix, stage 246 can proceed independently of the completion of stage 244. In another example, the policy engine may not obtain the compliance profile until the latest scheme inventory and policy matrix are obtained.

In another example, the policy engine can store previous scheme inventories and policy matrices. It can refer to the latest stored versions of these elements where it has received a waiting message from the policy server.

At stage 248, the policy engine can determine a capability scheme that will be implemented for the accessed virtual session. In particular, the policy engine can compare the combination of state values in the compliance profile to the policy matrix. The policy engine can determine or find the capability scheme for which all its respective requirements are met by that particular combination of state values. Table 2 provides an example of the operational aspects of a user device or a client VM that have states (state values) that are monitored and can define the information, or at least a part of the information, in a compliance profile, and in particular, a compliance sub-profile.

TABLE 2

Monitored Operational Aspects and Example State Values

| Operational Aspects | Example State Values | |
|---|---|---|
| W/Binary States | | |
| OS auto-updates | Enabled | Disabled |
| Drive encryption | Enabled | Disabled |
| VPN | Active | Inactive |
| IPSec | Enabled | Disabled |
| Screen lock | Enabled | Disabled |
| Firewall | Enabled | Disabled |
| Rooting and jailbreak detection | Enabled | Disabled |
| Device MDM/EMM enrollment | Enrolled | Not |
| W/Non-Binary States | | |
| Anti-virus installation state | Installed; Active; Expired | |
| Anti-virus signature age | Time value; Date of creation | |
| VPN | Active; Inactive; Split Domain Name System | |
| OS security patches | Names of patch files | |
| Connection Type | Wired; Wireless | |
| Wireless encryption mode | WEP; Open; WPA; WPA2; WPA3; WPA# + AES, TRIP, etc. | |
| Device type | Laptop; Mobile phone; Tablet; Desktop; Public computer | |
| Device certificates and key-pairs | List of certificates and key-pairs or IDs | |
| Device authentication method | Screenlock; Smartcard; Biometrics; Multifactor | |
| Geo/IP location | Coordinates; City and State | |
| Specific services running | User Account Control (UAC); Encrypting File System (EFS); DLP; EMM | |
| Apps and platform libraries installed | List of applications | |
| Vulnerabilities from installed apps and platform libraries | List of vulnerabilities for each app and library | |

In another example, the policy engine can implement a scoring system in stage 248 to determine the capability scheme to implement. With the scoring system, the policy engine can assign scores or percentages to capability schemes corresponding to a number of requirements matched by the compliance profile. Each capability scheme can be compared to the compliance profile and given a score or percentage. This example may especially be useful where there is not a 100% match between the compliance profile and any of the capability schemes.

In another example, the policy engine may reference a minimum score to shorten the comparison process. In particular, as the policy engine compares the compliance profile to each requirement for a particular capability scheme, the policy engine can estimate a maximum score that could be assigned to the capability scheme. When the estimate falls below the minimum score, the policy engine can move on to the next capability scheme for a comparison. In another example, the minimum score can be updated to the score of the most recently evaluated capability scheme having a score that is higher than the current minimum score. This example may especially be useful where there is not a 100% match between the compliance profile and any of the capability schemes.

In another example, the policy engine can receive the logon, notify the policy server to get the MAP, obtain the compliance profile, and compare the profile to the profile matrix to identify an appropriate capability scheme. In this example, the policy engine can send a name, ID, or other reference to the identified scheme, to the policy server. The policy server can then check to see if there are updates for the identified scheme and transmit the scheme to the policy engine. In yet another example, the policy engine can receive the logon notification, obtain the compliance profile, and forward it to the policy server. The policy server can compare, identify, and transmit the capability scheme to the engine.

At stage 250, the policy engine can analyze the determined scheme to identify the various actors that will be involved in the implementation of particular capabilities specified in the scheme. The policy engine will divide the capability scheme into sub-schemes, which each sub-scheme being assigned to a respective actor. Further, stage 250 can include the policy engine broadcasting the different session capability sub-schemes to their respective actors. In one example, the policy engine can devise four (4) sub-schemes for assignment. Those sub-schemes can be assigned, respectively, to the VM agent (sub-scheme 1), the policy engine itself (sub-scheme 2), the MS management service or the management agent for the user device (sub-scheme 3), and a network agent for the policy server (sub-scheme 4).

At stage 252, the VM client can transmit to the VM agent information, received data, logs, or a report related to the action. The transmission can be caused by, or based on, the user input processed by the VM client, ongoing operations by the user device, system updates, or any other action that involves a virtual sessions capability or a change to any aspect of the compliance profile. In response to receiving the action information, which may be a request to use a session capability or an update to the compliance profile, the VM agent will enforce sub-scheme 1 with respect to the request or update for the current virtual session.

At stage 254, the VM agent enforces virtual session capability sub-scheme 1 in response to receiving a request, an update, or combination of the two. Where the request corresponds to a session capability that the VM agent is responsible for, according to sub-scheme 1, the VM agent will access that capability of the virtual session if it is enabled. In the event that the capability is not enabled, the VM agent may transmit a notification to the VM client that the request cannot be addressed due to the functional limitations being enforced for the current virtual session. In another example, the VM agent may advise the VM client, which can subsequently advise a user, of the requirements that must be met for the capability to be enabled.

In one example, the VM agent serves as a first point of contact for the VM client, as it is primarily responsible for managing and maintaining the virtual sessions being accessed. As a result, sub-scheme 1 will include information regarding every session capability that is not served, enabled, performed, or otherwise managed by the VM agent. In accordance with sub-scheme 1, when a request of this nature is received, the VM agent will determine it is not responsible for that session capability by referring to sub-scheme 1. The VM agent can then forward the request to the policy engine. As described in more detail below, the policy engine addresses the request by enforcing sub-scheme 2.

As noted above, stage 254 includes transmitting any request that the VM agent is not responsible for addressing or any compliance info updates to the policy engine. Thus, sub-scheme 1 includes a forwarding protocol that is implemented by the VM agent to forward such requests, or a portion of such requests, and compliance profile updates to the policy engine. As a result of receiving the request or update, the policy engine, at stage 256, enforces sub-scheme 2 with respect to the request or update.

Based on the configuration of sub-scheme 2, the policy engine may address, partially address, or forward a request that the policy engine does not directly enforce or enable. With regards to compliance profile updates, for example a new firewall configuration, an antivirus update, or a new device enrollment, enforcement of sub-scheme 2 causes the policy engine to first determine if the update is addressed by the current sub-scheme. Where the update is not addressed, the policy engine determines that a new capability scheme is required and performs stages 244, 246, 248, and 250 with respect to the now-updated compliance profile.

In one example, sub-scheme 2 includes a forwarding protocol, but unlike the forwarding protocol in sub-scheme 1 that just forwards all requests to the policy engine, part of enforcing sub-scheme 2 includes the policy engine determining what actor would be responsible for the request. Upon making this determination, the policy engine forwards the request to the responsible actor. Where the request deals with an aspect of device enrollment or some other session capability that is enabled, managed, or carried out the management agent or the management server, the policy engine can forward the request to the management server.

Referring back to stage 256, where the forwarded request involves an aspect of the network or the connection to the network, the policy engine forwards the request to the network agent which enforces sub-scheme 3 with respect to the request in stage 258. For example, the policy engine can forward the request to the network agent when the user device is attempting to access the network from a new access network. Although the identity of the access network for accessing a network would be part of the compliance profile, this is an instance where a sub-scheme for another actor, here the network agent, can be configured to address this change in the compliance profile. More specifically, having identified the new access network and level of security it employs, the network agent can cause the user device to be connected to a different network segment than the one it was previously connected to, as described in more detail with reference to FIG. 3.

In one example, if the VM client is attempting to access the network through a type of connection that is not known or otherwise provided for by sub-scheme 3, enforcement of sub-scheme 3 in stage 258 may dictate that access to all segments of the network is denied. In another example, such a situation may trigger a lock out procedure that ends the VM client's access to the virtual session. In yet another example, the network agent can inform the policy engine of unknown connection type and in turn, the policy engine can again perform stages 244, 246, 248, and 250.

FIG. 3 is a sequence diagram of an example method for enforcing a virtual session capability scheme based on a change to a configuration of a network connection. At stage 310, a management agent executing on a user device can communicate with a first access network ("access network 1") in order to connect to a secure network that is maintained, for example, by an enterprise. The user device, which can be any type of computing device configured to connect to the internet, may be a personal device owned by a user, an enterprise owned or managed device, or a publicly available computing device. The management agent can attempt to connect to the access network, and to the network through the access network, via the internet. The management agent may enforce a general set of rules that provide a basic level of security to the device in determining whether to connect to access network 1.

At stage 312, the management agent transmits a connection status to the VM client, indicating that the user device is connected to access network 1. The VM client can request, or the management agent may be configured to provide, all the details related to the connection and access network 1 based on a successful connection. Information provided to the VM client can include an assigned IP address, a security profile of the access network 1, speeds of data transfer to and from the access network 1, and other monitored details. In one example, the VM client, prior to stage 310, may have received a request through an associated user interface, to connect to the network. Accordingly, stage 312 can be a response to the VM client forwarding the request or instruction to the management agent.

At stage 314, the VM client can transmit the connection status and request to connect to the network to the VM agent. More specifically, stage 314 is an exemplary instance of an execution of stage 252, discussed with reference to FIG. 2B, trigged by a change to, as well as a request to implement a capability of, the user device. In this case, the changed operational aspect is the user device's connection to the network. This status can be part of the compliance profile for the user device. In response to receiving the connection status, the VM agent enforces sub-scheme 1, and pursuant to that sub-scheme, forwards to the network agent the connection status information and the request to connect to the network.

At stage 318, the network agent enforces sub-scheme 4 with respect to the request and the connection status information. In one example, the network agent refers to sub-scheme 4 to determine if the access network 1 includes or implements certain security features that, per sub-scheme 4, are required for connection to various segments of the network. In one example, access network 1 can be a public or an internal subnetwork of an enterprise. In another example, the network agent processes the connection status information and determines a score for how secure access network 1 is. The network agent can also match the score with a network segment that has been assigned a range for security scores that access network 1's score falls into.

Different network segments can be assigned different profiles that have a varying range of requirements, or different score ranges. The profiles can be assigned based on: the criticality of functions the network segment supports; the sensitivity of documents and functions the network segments deals with or enables; and whether any data handled, or functions enabled, by a particular network segment are proprietary in nature. In one example, the level of requirements associated with a security profile or the score ranges may correspond to zone ratings. For example, a network segment that requires a high or maximum level of security, would be considered a zone 1 network segment. The zone 1 network segment can have the strictest security profile or the highest minimum value for a security score range.

The network, which underlays the virtual sessions, is segmented into zones using virtual local area network ("VLAN") capabilities implemented in software-defined network products, such as VMWARE's NSX. Each zone, with its respective segments, can be implemented by a respective VLAN. VMs that run the virtual sessions may be hosted on an underlying internal network, of which the VM server is a part, that can be segmented into multiple VLANs. The network stack on each VM and the network switches (virtual or physical) can be configured in a manner where a VM attached to a first VLAN is unable to access critical servers like databases or fileservers attached to a second VLAN, while a VM attached to the second VLAN can access those servers. This exemplary infrastructure can enable a virtual session, run by a VM connected to a zone 1 network segment, to be moved or reconnected to a zone 2 network segment.

Zone ratings can connote the relative criticality of the devices and operations supported by a particular segment. For example, an administrator can create a segment to serve highly critical enterprise assets, a production server and a production database for example, and assign the newly created segment a zone 1 rating. At the same time, the administrator can configure less critical or sensitive network segments. The capability schemes can specify a zone rating for a user device, and the user device can only communicate with other network devices with the same zone rating (network segment). A zone rating for the user device can be based on state values for certain operational aspects, such as up-to-date antivirus, encryptions, and wireless connection security. In another example, where a logon to the user device or the VM client was suspicious (e.g., several wrong attempts), the zone rating for user device can be assigned accordingly and that user device will be restricted to network segments having the same or lower zone ratings.

At stage 318, the network agent can determine that the security score or security profile for access network 1, and the connection to the network it can facilitate for the user device, meets the criteria for a connection to a network segment having a zone 1 security level requirement. Accordingly, at stage 320, the network agent can permit an operation or set of operations that facilitates a connection between the user device and a zone 1 network segment through access network 1.

Turning to the remainder of the sequence depicted in FIG. 3, stages 322 to 332 are similar to stages 310 to 320. At stage 322, the management agent may attempt to connect to the network through a second access network ("access network 2"). This situation may occur where a user of the user device is attempting to connect to the network using an open connection, whereas in stage 310, some form of authentication and security process or password was required to connect to access network 1. A real world example of this may include an employee that was working from home and using their private network in stage 310, and later the same day went to a coffee shop to continue working and attempted to connect to the network through the coffee shop's open network, which required no passwords or logon security procedures.

Similar to the operations in stages 312 and 314, in stage 324, the management agent provides a new connection status to the VM client. The VM client forwards the request and connection status detailing access network 2 to the VM agent at stage 326. Like in stage 316, the VM agent forwards the request and connection status to the network agent in stage 326 pursuant to its enforcement of sub-scheme 1. At stage 328, the network agent assesses access network 2 to determine a level of security that can be maintained by the network if a connection was permitted. As part of the assessment, the network agent determines a security profile or a security score for access network 2.

In one example, at stage 329, the network agent can optionally check the status of the connection between access network 1 and the zone 1 network segment previously created in stage 320. It may be the case that the network implements a protocol that automatically disconnects a access network from a network segment once a user device disconnects from the access network used to connect to the network. However, as an added layer of security, when a new connection is requested, the network agent can check to make sure that the access network, here access network 1, for a previous connection has been disconnected from the network. In the event that a connection still persists, the network agent will disconnect or otherwise discontinue that connection at stage 329.

As access network 2 is accessed and connected to without any significant security protocols, the network agent determines that access network 2 and the connection it can facilitate has a security profile or security score that is not of the level of a zone 1 network segment. Rather, the network agent determines that access network 2 meets the lesser security requirements of a zone 2 network segment. As a result, the network agent permits a connection between the user device and a zone 2 network segment to proceed through access network 2 in stage 230.

In one example, the network agent may determine that a security profile or score corresponds to a zone for which network segment with that zone configuration is not available. In this situation, connection to the network may not be permitted. In another example, at optional stage 331, the network agent can cause a zone 3 network segment to be created. More specifically, the network agent may cause a portion of the network to be partitioned and set up with zone 3 security requirements. In one example, the network agent may instruct the network, or a management server that manages the network, to create the network segment.

FIG. 4 illustrates a schematic representing exemplary system components for permitting access to a virtual session and enabling select virtual session capabilities on a user device. As shown, the system components can include a user device 410, a management server 420, a gateway server 430, a VM server 440, a policy server 450, an admin device 460, and a network 470. Although only the VM sever 440 is shown as connected to the network 470, each of the gateway, management, and policy servers 420, 430, and 450 may be in communication with the network 470. In another example, communication between the various servers can be facilitated through the network.

Both the user device 410 and the admin device 460 can be a device, such as a mobile phone, laptop, computer, tablet, or the like, that includes one or more processors and memory storage locations. The user device 410 can be part of a system comprising the system components of FIG. 4, as an enterprise-owned device configured to cooperate with the management server 420. In another example, the user device 410 can be user-owned and enrolled with the management server 420, and therefore at least partially supervised or managed by the management server 420. On the other hand, the admin device 460 can be associated with or part of at least the policy server 450, and any of the management, gateway, of VM servers 420, 430, 440, and serve as a tool to manage a computing infrastructure. Both the user device 410 and the admin device 460 can be configured to include a VM client that accesses a virtual session (implements an instance of a virtual machine), or otherwise be configured to access a virtual session as defined herein.

Each of the management, gateway, VM, and policy servers 420, 430, 440, 450 can include one or more servers that can each provide centralized management of, and operational data gathering from, a respective infrastructure of data entities. Each of these servers can: be a single server or a network of servers; utilize one or more processors and memory stores; provide an administrator with tools to manage an infrastructure; and run one or more VMWARE solutions, such as VSPHERE Client, VCENTER SERVER, and VREALIZE Suite.

The management server 420 can provide an MDM or EMM system with which devices, such as the user device 410, are enrolled. In one example, the management server 420 can receive a compliance profile from a VM client being implemented on the user device 410. In another example, the management server 420 can be configured to receive operational data from the user device 410 and extract state values for operational aspects that are part of a compliance profile. In either example, the management server 420 can process the state values of the operational aspects that define at least a compliance sub-profile, and determine a security sub-profile. Further, the management sever 420 can be provided with a tool that an administrator can use to set the operational aspects to be tracked, and how their state values may be interpreted to determine a security sub-profile.

In one example, the management server 420 can include one server or a group of servers distinct from the VM server 440. In another example, the management server 420 and the VM server 440 can be one in the same. In yet another example, the management server 420 processes operational data and produces a final compliance profile that is used by the gateway server 430 to determine if virtual session access will be granted. The management server 420 can be provided by a third party relative to an owner of at least the gateway 430 and VM servers 440. As discussed above, the management server 420 can belong to a third-party that provides a service product, such as OPSWAT, that secures and manages endpoints (e.g., user devices), by monitoring, classifying, assessing, and managing applications.

As previously described, the gateway server 430 can be a reverse proxy server that is maintained behind a firewall in a private network. The gateway server 430 can direct requests from clients to an appropriate backend server, such as the VM server 440. In another example, the gateway server 430 can provide an added level of abstraction and control to ensure a smooth flow of network traffic between, for example, the VM client and the VM server 440, in accordance with various security protocols it implements.

As shown in FIG. 4, the VM server 440 includes a policy engine and network and VM agents at least in the sense that the VM server hosts a VM in which the policy engine and the network and VM agents run as services inside a guest OS of a VM/virtual session. In one example, the VM server functions as a VM connection broker such that the VM server connects a virtual session launch request with an actual VM running inside a hypervisor. Accordingly, some virtual session capabilities described herein are implemented by actors as previously mentioned, running in a guest OS. Additionally, the VM server 440 can include a management interface, a backup agent, and a hypervisor (not shown). With these additional components, the VM server 440 can provide a two-way communication channel between it and the user device 410. Further, managed communication between these additional components enables the VM server 440 to generate, maintain, and support virtual machines, which can be accessed as the virtual sessions described herein.

The policy server 450 can store and access MAPs and session capability schemes that can be used either by VM server 440 or the policy server 450, to configure a virtual session for the user device 410. In one example, the policy server 450 can allow user profiles and personal settings to follow users across devices and ensure consistent user experiences. In another example, the policy server 450 can additionally provide a tool or run a software product that enables an administrator to configure and deploy desktop computer settings for employees of an enterprise.

Network 470 can be configured with overlay technology that can be used to create and maintain parallel virtual network segments ("network segments"), such as SEG 1, SEG 2, SEG 3, and SEG 4 shown in FIG. 4. In one example, each network segment (e.g., SEG 3) is fully isolated from other the networks segments (e.g., SEG 1, SEG 2, and SEG 4). In addition, network 470 can be configured such that each network segment is isolated from an underlying physical network.

In one example, an agent or service specific to the network 470 executes on top of existing network and data center equipment that maintains the network 470. The agent or service may be provided by, or at least in communication with, a network agent such as the network agent for the VM server 440. In another example, the agent or service can implement various security policies, which may be provided by the policy server 450, to ensure secure communication within network 470. The agent or service can implement these policies, and thereby execute logic and progress through workflows, by using names or IDs for a VM, a virtual session, a virtual network, an OS, or a network segment.

FIG. 5 illustrates an exemplary GUI 500 for a console that can be used to customize virtual session capability schemes to be implemented by various methods described herein. The GUI 500 includes a mode selection bar 510 and allows a user to select a view, edit, or a create mode selecting a corresponding view, edit, and create scheme options 512, 514, 516. In the view mode, no options are provided for changing the scheme being displayed. In the edit mode, both editable and locked selections will be shown. Below the mode selection bar 510 the configuration console provides a scheme search entry field 518. A user that knows a name, a part of name, an ID number, or part of an ID number for a capability scheme can enter that information in to the scheme search field 518 in order to view selectable search results. Each result corresponds to a capability scheme that, when selected, is displayed in the configuration console.

The GUI 500 further provides a configuration module 520 that includes an operational aspect search field 522 and a capability search fields 524. These search fields can be used to search within a currently displayed capability scheme. For example, if a user enters "OS update" in the operational aspect search field, that operational aspect and accompanying information for categories 534 to 540 discussed below, for that capability scheme, will be displayed. Similar to the scheme search field 518, if a user puts in a partial name or word that is included in the names of multiple operational aspects for a current capability scheme, each of those operational aspects will be displayed in a configuration table 530. If an entry for the capability search field 524 matches any capabilities incorporated in the current capability scheme, all the operational aspects (which can be more than one) that impacts the scope of that capability that may be allowed per that capability scheme, will be displayed. Below the configuration table 530, the GUI 500 includes a display field that displays an ID of a current capability scheme being displayed.

The configuration table 530 includes an operational aspect, state, capability, current configuration, and configuration option categories 532, 534, 536, 538, 540. Each operational aspect covered by a scheme may have an entry 550 that can be accessed, displayed in the configuration table 530, and potentially edited.

For example, the first entry in the configuration table 530 is for a drive encryption operational aspect 552 ("drive entry 552"). The state setting 534 for the drive entry is for a drive not being encrypted. However, by using the drop-down arrow next to the no encryption setting 554, a user could change this. As shown, a single operational aspect can be associated with one or more capabilities. For the scheme illustrated, a capability to copy data from a virtual session to a user device—data egress 556A—has a disabled configuration 558A for an unencrypted drive. On the other hand, a capability to copy data from a user device to a virtual session—data ingress 556*b*—has an enabled configuration 558B for an unencrypted drive. However, each of these configurations can be changed per the drive entry config options 560. It will be noted that the drive entry config options 560 are examples of binary configuration options 562—either the capability is enabled or it is not.

On the other hand, other capabilities may have non-binary configuration options, such as a sensitivity level configuration 564 for documents that can be accessed during virtual session. More specifically, a user of the GUI 500 could set the scheme being displayed to allow only low sensitivity documents to be accessed by a user device during a virtual session for a user device that implements no authentication process. Each state value displayed in the drop-down box 566 corresponding to the drop-down arrow being selected by a cursor in GUI 500 can have its own configuration option setting. More specifically, a user of GUI 500 could select a multi-factor authentication process in the drop-down box 566 and selected classified level in the sensitivity level configuration 564. For the same capability scheme, the user could next select a single factor authentication in the drop-down box 566 and select a medium level in sensitivity level configuration 564.

A drop-down arrow is also provided next to the state setting 554 for the drive entry 552. In one example, a capability scheme may provide for multiple state settings for one or more operational aspects. In the GUI 500 of FIG. 5, the displayed scheme can have drive encrypted and unencrypted settings to go along with the state settings and capability configurations of all the other operational aspects included in the scheme. This means that this particular scheme may be matched with more than one compliance profile but be different for a compliance profile with an encrypted drive versus one that is not encrypted.

This feature allows for a capability scheme to still be applicable in certain situations where a compliance profile for a user device changes. For example, when a virtual session is first accessed, a USB drive connected to a user device may be decrypted, but during the virtual session becomes encrypted or disconnected. In another example, screen-capturing software on the user device could be active when a session starts, but is shutdown during the virtual session by a user. Rather than find a new capability scheme, a different version of the current scheme that includes an encrypted USB drive or an inactivescreen capturing software can be implemented.

Referring to the example including the USB drive, it is possible that at the beginning of a virtual session data egress may not be permitted to the USB drive. In addition, based on a security threat or vulnerability regarding the unencrypted drive exposing data from the virtual session, a security assessment for the user device relegates the user device to only have access to low sensitivity level documents. During the virtual session however, the USB drive may get encrypted or disconnected. According to one aspect of the present disclosure, one capability scheme may be configured to provide for both situations. In particular, after the encryption or disconnection, a compliance profile is updated such that data egress is enabled and high sensitivity level documents can be accessed.

In the case of the screen-capture software, at the beginning of the virtual session, documents having any degree of sensitivity may not be able to be displayed while the software is running. However, during the session, that software may be shutdown. According to one aspect of the present disclosure, one capability scheme may be configured to provide for situations. More specifically, after the screen-capture software is shutdown, a compliance profile is updated, and at least medium sensitivity level documents can be displayed on the user device through the virtual session.

In one example, the GUI 500 can provide an option to associate additional capabilities to an operational aspect with an entry in the configuration table. As show in FIG. 5, for the second entry in the configuration table, the box for the capabilities category 536 is provided with a capability add option 568.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method of providing a virtual session to a user device in response to a request from the user device, the method comprising:
   receiving, at a management server of a device management system, operational data from a plurality of user devices, including a first user device, that are managed by the device management system, each of the user devices including a management agent running therein to obtain the operational data and transmit the operational data to the management server;
   for each of the user devices, the management server performs the steps of:
      determining a compliance sub-profile using the operational data from the user device;
      providing, from the management server, the compliance sub-profile to a security service;
      requesting a security assessment from the security service based on the compliance sub-profile;
      receiving a security sub-profile from the security service, the security sub-profile including the requested security assessment; and
      generating a compliance profile including the compliance sub-profile and the security sub-profile; and
   providing by the management server to a gateway server that is controlling access to virtual sessions, the compliance profile of the first user device in response to a request from the gateway server for the compliance profile of the first user device, wherein the gateway server permits the first user device to access a virtual session based on determining that the security sub-profile of the compliance profile of the first user device satisfies a minimum access policy.

2. The method of claim 1, wherein the access to the virtual session is limited to a portion of virtual session capabilities for a full capability scheme.

3. The method of claim 2, wherein the portion of virtual session capabilities is determined based on the security sub-profile.

4. The method of claim 2, wherein access to the virtual session is limited by a virtual machine server that configures the virtual session.

5. The method of claim 2, wherein the portion of virtual session capabilities is determined based on an overall security rating for the first user device.

6. The method of claim 1, wherein the compliance profile for the first user device specifies that the first user device is connected to a network through an unsecure connection.

7. The method of claim 1, wherein the virtual session:
   allows the first user device to access a virtual machine server through a first logical network segment, and
   restricts the first user device from accessing the virtual machine server through a second logical network segment that serves devices having a secure connection to the network.

8. A non-transitory, computer-readable medium containing instructions that, when executed by a hardware-based processor of a management server of a device management system, performs stages for providing a virtual session to a user device in response to a request from the user device, the stages comprising:
   receiving operational data from a plurality of user devices, including a first user device, that are managed by the device management system, each of the user devices including a management agent running therein to obtain the operational data and transmit the operational data to the management server;
   for each of the user devices, performing the steps of:
      determining a compliance sub-profile using the operational data from the user device;
      providing, from the management server, the compliance sub-profile to a security service;
      requesting a security assessment from the security service based on the compliance sub-profile;
      receiving a security sub-profile from the security service, the security sub-profile including the requested security assessment; and
      generating a compliance profile including the compliance sub-profile and the security sub-profile; and
   providing to a gateway server that is controlling access to virtual sessions, the compliance profile of the first user device in response to a request from the gateway server for the compliance profile of the first user device, wherein the gateway server permits the first user device to access a virtual session based on determining that the security sub-profile of the compliance profile of the first user device satisfies a minimum access policy.

9. The non-transitory, computer-readable medium of claim 8, wherein the access to the virtual session is limited to a portion of virtual session capabilities for a full capability scheme.

10. The non-transitory, computer-readable medium of claim 9, wherein the portion of virtual session capabilities is determined based on the security sub-profile.

11. The non-transitory, computer-readable medium of claim 9, wherein access to the virtual session is limited by a virtual machine server that configures the virtual session.

12. The non-transitory, computer-readable medium of claim 9, wherein the portion of virtual session capabilities is determined based on an overall security rating for the first user device.

13. The non-transitory, computer-readable medium of claim 8, wherein the compliance profile for the first user device specifies that the first user device is connected to a network through an unsecure connection.

14. The non-transitory, computer-readable medium of claim 8, wherein the virtual session:
 allows the first user device to access a virtual machine server through a first logical network segment, and
 restricts the first user device from accessing the virtual machine server through a second logical network segment that serves devices having a secure connection to the network.

15. A system for providing a virtual session to a user device in response to a request from the user device, comprising:
 a memory storage including a non-transitory, computer-readable medium comprising instructions, and
 a computing device of a management server of a device management system, including a hardware-based processor that executes the instructions to carry out stages comprising:
 receiving operational data from a plurality of user devices, including a first user device, that are managed by the device management system, each of the user devices including a management agent running therein to obtain the operational data and transmit the operational data to the management server;
 for each of the user devices, performing the steps of:
  determining a compliance sub-profile using the operational data from the user device;
  providing, from the management server, the compliance sub-profile to a security service;
  requesting a security assessment from the security service based on the compliance sub-profile;
  receiving a security sub-profile from the security service, the security sub-profile including the requested security assessment; and
  generating a compliance profile including the compliance sub-profile and the security sub-profile; and
 providing to a gateway server that is controlling access to virtual sessions, the compliance profile of the first user device in response to a request from the gateway server for the compliance profile of the first user device, wherein the gateway server permits the first user device to access a virtual session based on determining that the security sub-profile of the compliance profile of the first user device satisfies a minimum access policy.

16. The system of claim 15, wherein the access to the virtual session is limited to a portion of virtual session capabilities for a full capability scheme.

17. The system of claim 16, wherein the portion of virtual session capabilities is determined based on the security sub-profile.

18. The system of claim 16, wherein access to the virtual session is limited by a virtual machine server that configures the virtual session.

19. The system of claim 16, wherein the portion of virtual session capabilities is determined based on an overall security rating for the first user device.

20. The system of claim 15, wherein the virtual session:
 allows the first user device to access a virtual machine server through a first logical network segment, and
 restricts the first user device from accessing the virtual machine server through a second logical network segment that serves devices having a secure connection to the network.

* * * * *